United States Patent
Lundberg et al.

(10) Patent No.: US 9,094,673 B2
(45) Date of Patent: Jul. 28, 2015

(54) ARRANGEMENT AND METHOD FOR PROVIDING A THREE DIMENSIONAL MAP REPRESENTATION OF AN AREA

(75) Inventors: Kristian Lundberg, Linköping (SE); Folke Isaksson, Linköping (SE)

(73) Assignee: SAAB AB, Linköping (SE)

( * ) Notice: Subject to any disclaimer, the term of this patent is extended or adjusted under 35 U.S.C. 154(b) by 796 days.

(21) Appl. No.: 12/667,560

(22) PCT Filed: Jul. 4, 2007

(86) PCT No.: PCT/EP2007/056780
§ 371 (c)(1),
(2), (4) Date: Jun. 9, 2010

(87) PCT Pub. No.: WO2009/003529
PCT Pub. Date: Jan. 8, 2009

(65) Prior Publication Data
US 2010/0250125 A1    Sep. 30, 2010

(51) Int. Cl.
*H04N 13/02* (2006.01)
*G06T 7/00* (2006.01)

(52) U.S. Cl.
CPC .......... *H04N 13/0239* (2013.01); *G06T 7/0075* (2013.01); *H04N 13/0207* (2013.01); *G06T 2207/10032* (2013.01); *G06T 2207/30188* (2013.01)

(58) Field of Classification Search
CPC ........... H04N 13/0207; H04N 13/0239; G06T 7/0075; G06T 2207/10032; G06T 2207/30188
USPC ............. 701/400, 420, 421, 422, 423, 1, 408, 701/409, 410, 412, 417, 430, 436, 445, 701/448; 345/419, 428, 618, 619, 623, 624, 345/629, 632, 640; 356/16
See application file for complete search history.

(56) References Cited

U.S. PATENT DOCUMENTS

| 4,695,959 A | 9/1987 | Lees et al. |
| 4,855,961 A * | 8/1989 | Jaffe et al. .......... 367/7 |

(Continued)

FOREIGN PATENT DOCUMENTS

| EP | 1209623 | 5/2002 |
| EP | 1473673 | 11/2004 |

(Continued)

OTHER PUBLICATIONS

Disparity; retrieved from the internet on Oct. 9, 2013; html: url: http://www.thefreedictionary.com/disparity.*

(Continued)

*Primary Examiner* — Mussa A Shaawat
*Assistant Examiner* — James E Stroud
(74) *Attorney, Agent, or Firm* — Venable LLP; Eric J. Franklin; Jeffri A. Kaminski (57) ABSTRACT

An arrangement and a method for providing a three dimensional map representation of an area. The arrangement includes an image generating unit and a processing unit. The image generating unit is arranged to generate time recorded images. The image generating unit is arranged to provide a plurality of at least partly overlapping images each covering at least a part of the area. The processing unit is arranged to stereo process an arbitrary number of at least partly overlapping image sets generated by the image generating unit so as to provide the three dimensional map representation. A navigation unit is arranged to output time recorded navigation states related to the image generating unit. The processing unit is arranged to, for each time recorded image to be stereo processed, associate the navigation states relating to a corresponding time record.

23 Claims, 6 Drawing Sheets

(56) References Cited

U.S. PATENT DOCUMENTS

| | | | |
|---|---|---|---|
| 5,517,419 A * | 5/1996 | Lanckton et al. | 701/409 |
| 5,606,627 A * | 2/1997 | Kuo | 382/154 |
| 5,691,957 A * | 11/1997 | Spiesberger | 367/3 |
| 2002/0060784 A1 | 5/2002 | Pack et al. | |
| 2004/0005091 A1* | 1/2004 | Maruya | 382/154 |
| 2004/0131248 A1* | 7/2004 | Ito et al. | 382/154 |
| 2004/0264761 A1* | 12/2004 | Mas et al. | 382/154 |
| 2007/0002040 A1* | 1/2007 | Oldroyd | 345/419 |

FOREIGN PATENT DOCUMENTS

| | | | |
|---|---|---|---|
| JP | 10291188 A * | 11/1998 | |
| JP | 2003-323640 | 11/2003 | |

OTHER PUBLICATIONS

"Proposed amendments Mar. 19, 2015"; proposed amendments Mar. 19, 2015.pdf; author: Eric Franklin; submitted: Mar. 19, 2015.*
Communication pursuant to Article 94(e) EPC, dated Aug. 23, 2012, from the European Patent Office, issued in connection with counterpart European Patent Application No. 07 787 076.4.
PCT/ISA/210—International Search Report—Feb. 7, 2008.
PCT/IPEA/409—International Preliminary Report on Patentability—Oct. 21, 2009.
Written Opinion of the International Preliminary Examining Authority—Jul. 3, 2009.
Written Opinion of the International Searching Authority—Feb. 7, 2008.

* cited by examiner

ARRANGEMENT AND METHOD FOR PROVIDING A THREE DIMENSIONAL MAP REPRESENTATION OF AN AREA

CROSS-REFERENCE TO RELATED APPLICATIONS

This application is the national phase under 35 U.S.C. §371 of PCT/EP2007/056780 filed 4 Jul. 2007.

TECHNICAL FIELD

The present invention relates to an arrangement and method for proving a three dimensional map representation of an area. In particular, it concerns generation of images and stereo-processing of said images so as to provide said three-dimensional map representation.

BACKGROUND

A fast growing market both in civilian and military business is geographical information systems. Knowledge about geographical conditions forms a fundamental decision support to companies, authorities and in the military. The geographical information comprises digital maps having superposed information layers such as infrastructure, terrain type and different types of objects. It is a time consuming process to form two dimensional maps comprising capturing images of the terrain from an aircraft and post-processing of the captured images. It is an even more time consuming process to form three dimensional maps from captured images or range data sets of the terrain/infrastructure. There are available today different methods such as photogrammetric methods with manual stereo-processing and laser scanning. These methods require time-consuming post-processing. Therefore, the formation of three-dimensional maps becomes expensive. As a consequence thereof, updates of the maps are made with a low updating frequency.

EP 1 657 927 discloses image-based movement tracking of a number of objects in a particular area based on stereo-processing. In this application, cameras are mounted in fixed and known positions. Therefore, matching between images captured by the different cameras is less time consuming than in the case of moving cameras.

One object of the present invention is to provide an improved way of providing three dimensional map representations.

SUMMARY

This has in one embodiment of the present invention been achieved by means of an arrangement for providing a three dimensional map representation of an area. The arrangement comprises an image generating unit and a processing unit. The image generating unit is arranged to generate time recorded images and to provide a plurality of at least partly overlapping images each covering at least a part of said area. The processing unit is arranged to stereo process an arbitrary number of at least partly overlapping image sets generated by said image generating unit so as to provide said three dimensional map representation. The arrangement is characterized in that a navigation unit is arranged to output time recorded navigation states related to the image generating unit, and in that the processing unit is arranged to, for each time recorded image to be processed by the stereo processor, associate the navigation states relating to a corresponding time record. The time recorded navigation states comprises in one embodiment position and attitude. The navigation unit comprises in one example an inertial navigation system and means for providing position data in a predetermined coordinate system, such as a GPS receiver or a map.

The use of the navigation states provided by the navigation unit enables position determination of the time recorded images with high accuracy. It even enables position determination for a number of points (pixels) or each point (pixel) in the time recorded images. The positions are determined in a predetermined coordinate system. Due to the fact that the positions of the images are determined with high accuracy, the stereo-processing can be performed without any ground based infrastructure. Therefore, the processing is less costly and time consuming. It can even be performed in real time or near real time. Moreover, each point or pixel in the three-dimensional map representations provided is inherently related to a position in the predetermined coordinate system.

In one embodiment, the image generating unit is mountable on a movable carrier, such as a land vehicle, satellite, aircraft, watercraft, for example a lorry, airplane, ship or submarine. In one embodiment the image generating unit can be hand held or mounted on a person.

The present invention also relates to a method for providing a three dimensional map representation of an area comprising the steps of:
 generating time recorded images,
 providing a plurality of at least partly overlapping images each covering at least a part of said area,
 forming an arbitrary number of at least partly overlapping image sets from said provided at least partly overlapping images, and
 processing said image sets so as to provide said three dimensional map representation. The method is characterized by outputting time recorded navigation states comprising position and attitude, and to, for each time recorded image to be processed by a stereo processor, associate the navigation states relating to a corresponding time record.

The present invention further relates to a computer programme comprising a programme code for performing the method steps when said computer programme is run on a computer.

DETAILED DESCRIPTION

Figure 1:
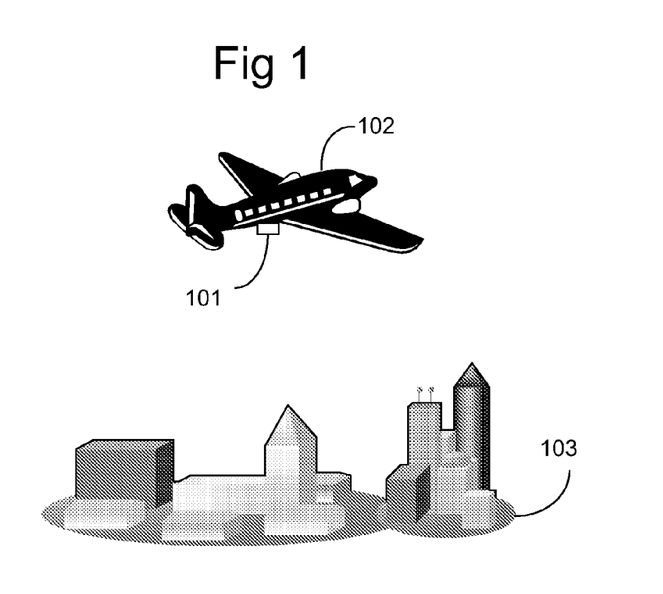
FIG. 1 illustrates an arrangement for providing a three dimensional map representation of an area mounted on an aircraft.

In FIG. 1, an arrangement 101 for providing a three dimensional map representation of an area 103 is mounted on a movable carrier 102 in the form of an aircraft. The movable carrier is in an alternative example (not shown) a satellite, a land vehicle, or a watercraft, for example a lorry, ship or submarine. The arrangement 101 can also be hand held or mounted on a person.

Figure 2:
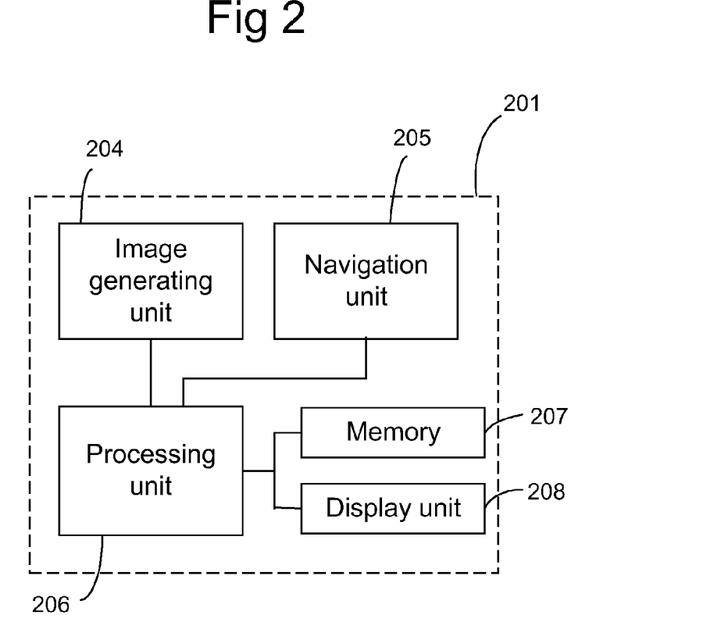
FIG. 2 is a block scheme showing an example of the arrangement of FIG. 1.

In FIG. 2, an arrangement 201 for providing a three dimensional map representation of an area comprises an image generation unit 204, a navigation unit 205 and a processing unit 206. In the shown example, the arrangement 201 also comprises a memory 207 for storing data related to the three dimensional map representation calculated by the processing unit 206, and a display unit 208 arranged to display the map representation calculated by the processing unit 206. In an alternative example, the arrangement comprises either the memory 207 or the display unit 208. In yet another alternative example, the arrangement comprises a transmitter (not shown) arranged to transmit the data related to the provided three dimensional map representation to a receiver in a remote location. In one example, the transmitter substitutes the memory 207 and/or the display unit 208. In an alternative example, the transmitter is provided in addition to the memory and/or the display unit.

The image generating unit 204 is arranged to generate time recorded images. The time records are given with an accuracy sufficient for the application. The time records are for example provided from a GPS-receiver 412 in the arrangement 201.

Figure 3:
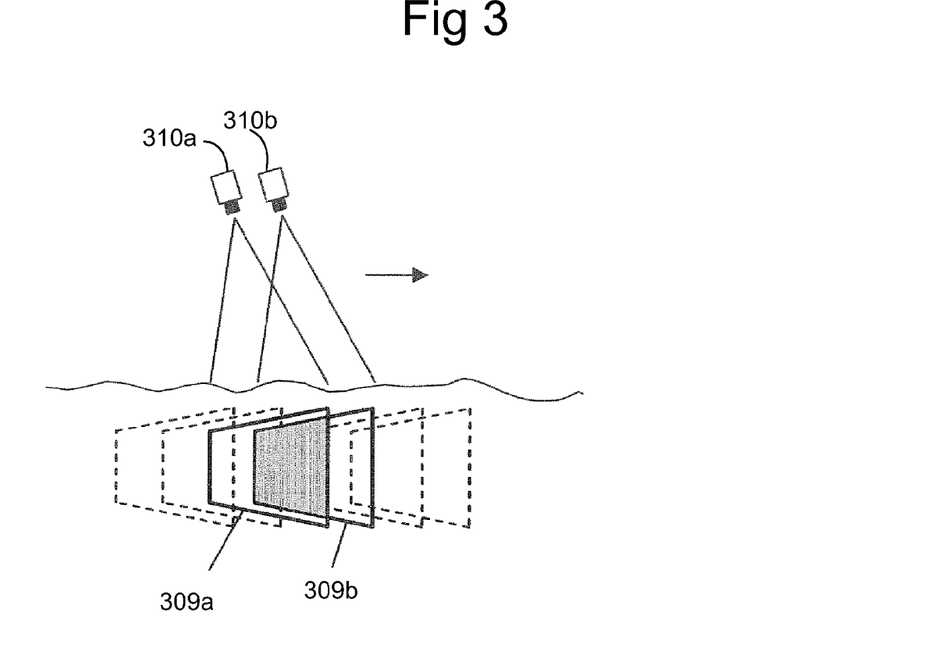
FIG. 3 illustrates schematically the function of an image generation unit in the arrangement in FIG. 2.

In FIG. 3, the image generation unit comprises in one example one image capturing unit. At a first time, the image capturing unit is placed at a first position 310a so as to capture an image of an area 309a. At a second time, the image capturing unit is placed at a second position 310b so as to capture an image of an area 309b. The image generating unit is arranged to provide a plurality of at least partly overlapping images each covering at least a part of the area 103. Accordingly, the required updating frequency of the images captured by the image generation unit so as to provide overlapping images depends on the travelling speed of the carrier 102, a distance to a plane in which the area is formed and the size of a geographical area covered by each image. In the example, wherein the carrier 102 is an aircraft, the distance to a plane in which the area lies is approximately the distance to the ground. If the image generation unit comprises a plurality of image capturing units, the image capturing units can be arranged to cooperate so as to enable decreasing the updating frequency. FIG. 3 can also be seen as it comprises a plurality of image capturing units 310a, 310b fixed mounted in relation to each other. The images of the areas 309a, 309b captured by the respective image capturing units 310a, 310b are then in one example captured at the same time.

Figure 4:
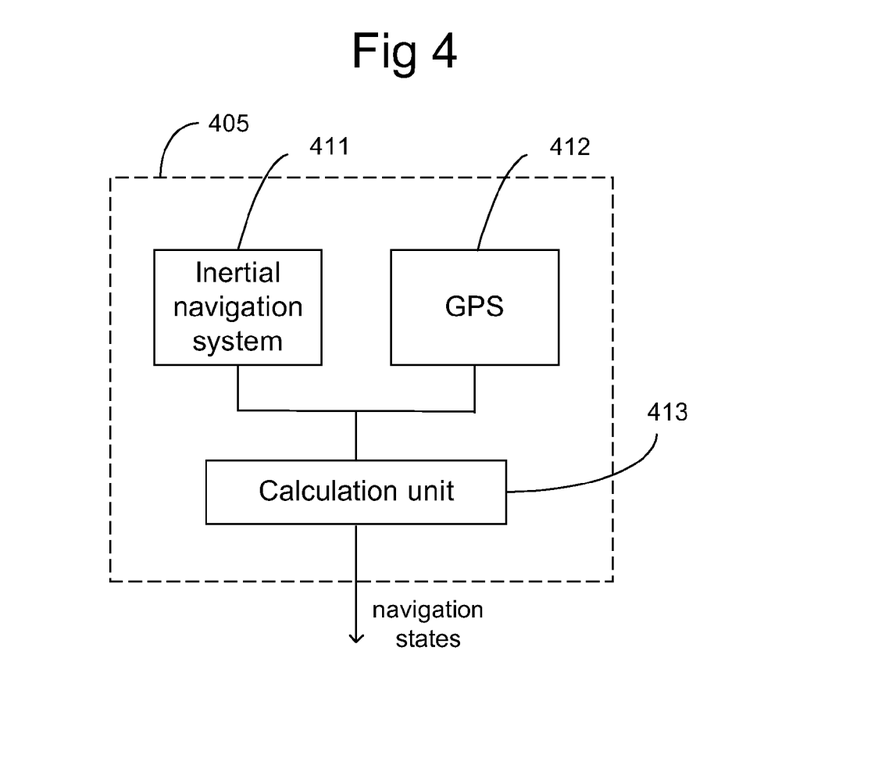
FIG. 4 is a block scheme showing an example of a navigation unit in the arrangement of FIG. 2.

In FIG. 4, a navigation unit 405 is arranged to output time recorded navigation states related to the image generating unit 204. The time recorded navigation states comprises in one embodiment position and attitude. The navigation unit 405 is arranged to continuously calculate the motions of the image generating unit 204. The navigation unit 405 comprises a calculation unit 413 arranged to continuously calculate for example position and attitude angle for the image capturing unit(s) based on the calculated motions and rotations. The navigation unit 405 comprises in one example an inertial navigation system 411 arranged to provide the motions and rotations of the image generating unit 204. The navigation unit comprises in one example means for providing attitude and also position data in a predetermined coordinate system. The position data is for example provided by means of a GPS receiver 412 or a digitally stored map. The time records of the navigation states are in one example given with approximately the same accuracy as the time records of the images. The time records are provided using the same time reference as is used by the image generation unit. The time records are for example provided from the GPS-receiver 412.

The inertial navigation system 411 is in the example described above mounted in a known relation to the image generating unit such that the navigation states provided directly relates to the navigation states of the image generating unit. If the image generating unit comprises a plurality of image capturing units, an inertial navigation system is in one example associated to each image capturing unit, whereby navigation states can be provided directly related to the respective image capturing unit. In accordance therewith, the image capturing units can be mounted independently of each other. The navigation states are in one example both a three dimensional position vector and a three dimensional attitude vector in a predefined coordinate system, but can also comprise a three-dimensional velocity vector in a predefined coordinate system. The velocity vector is for example directly provided from the inertial navigation system 411 in the navigation unit. The functional aspect of an inertial navigation system and how it calculates navigation states is well known.

The image capturing units are mounted with such a tilt angle so as to provide sufficient information for the actual application. For example, in an application of three dimensional modelling of man made objects such as buildings or bridges, vertical information is of importance. Therefore, in this application, the image capturing unit should be tilted so as to provide an accurate modelling of vertical surfaces.

Figure 5:
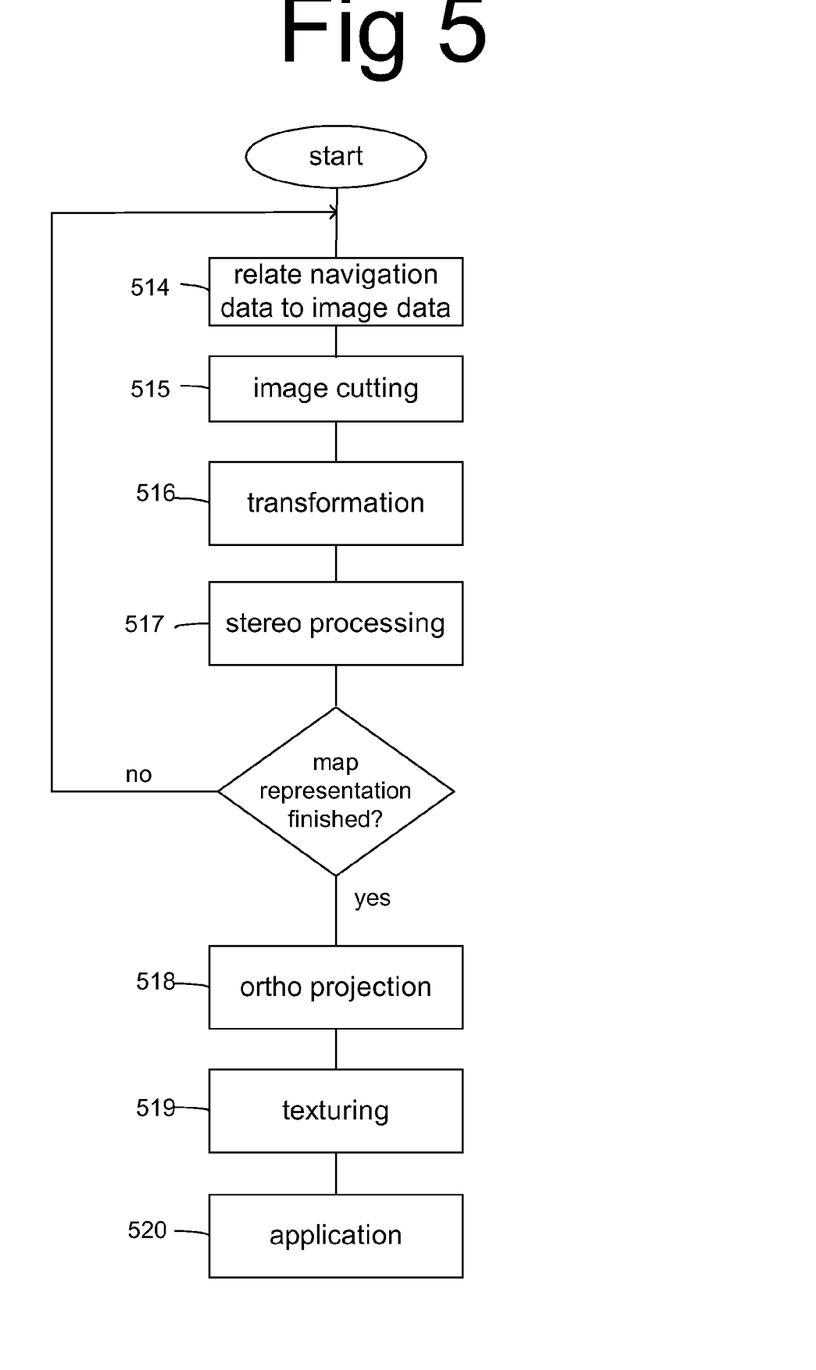
FIG. 5 is a flow chart showing an example of a process performed by a processing unit in the arrangement of FIG. 2.

In FIG. 5, the processing unit 206 is arranged to process a number of at least partly overlapping image sets generated by said image generating unit so as to provide said three dimensional map representation. The image sets comprises each two or more images. The processing unit 206 is arranged to be fed with the time recorded images from the image generating unit 204 and the time recorded navigation states from the navigation unit 205. Camera calibration is performed by a parameter estimation procedure directly from image data, as for example in reference "An Efficient and Accurate Camera Calibration Technique for 3D Machine Vision" by R. Y. Tsai, Proceedings of IEEE Conference on Computer Vision and Pattern Recognition, Miami Beach, Fla., pp. 364-374, 1986.

In one example, wherein the image generating unit comprises a plurality of image capturing units 310a, 310b, the image sets comprises overlapping images captured at substantially the same time (i.e. the images are associated to corresponding time records) by the image capturing units 310a, 310b of the image generating unit. In the following example, sets comprising two images, forming image pairs, are described.

The processing unit 206 is arranged to execute a number of steps on a number of at least partly overlapping image sets generated by the image generating unit 204 so as to provide the three dimensional map representation. The steps performed by the processing unit comprise a step of relating 514 the navigation data to the image data. Accordingly, image data is correlated to navigation data having a corresponding time record. In one example, each pixel of the image is correlated to corresponding navigation data. In another example, the pixels in a subset of pixels in the image are each correlated to corresponding navigation data. As discussed above, the navigation data relates to the position and attitude of the image capturing unit(s) in a geographical coordinate system. Each pixel of the image is then associated with a geographical coordinate on the ground.

Only those parts of the images are used in the subsequent processing, which matches with a corresponding area in the other image of the image pair. In the illustrated example, the processing unit 206 is arranged to remove those parts of the images not having a correspondence in the other image of the image pair in a cutting step 515.

In a following transformation step 516 of the illustrated example, the images of each image pair are transformed to a common ground plane images.

Figure 6:
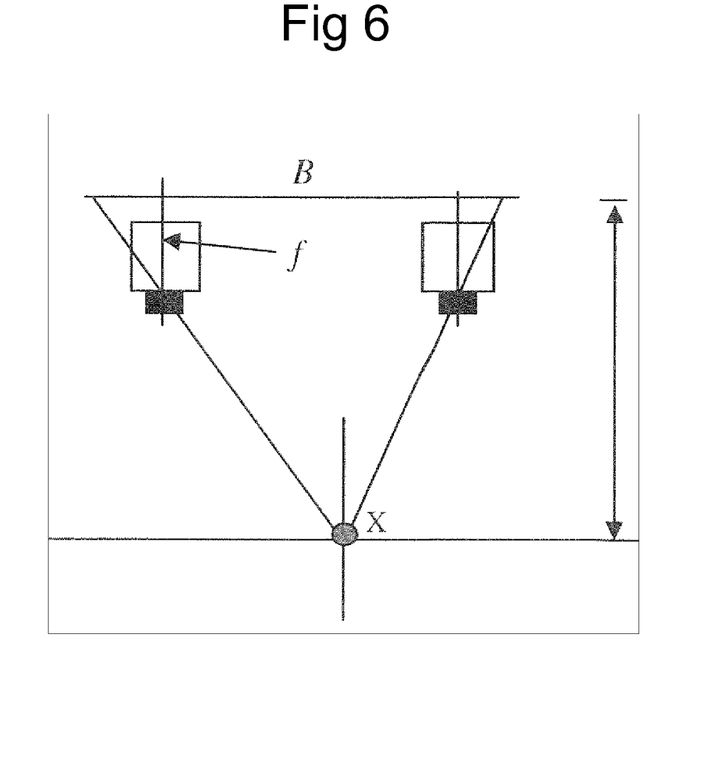
FIG. 6 illustrates schematically the geometry used in stereo processing

Thereafter, the transformed images of each image pair are used along with the position of the image capturing unit(s) when the two images were captured so as to perform stereo calculations in a stereo processing step 517. In FIG. 6, the distance between the two image capturing unit positions is defined as a base length B. If an object can be unambiguously determined in both the images, the object will be somewhat displaced with a distance corresponding to the distance between a base plane in which the base length B lies, and the object. This displaced distance is denoted disparity. In the example illustrated in FIG. 6, the optical axles of the two image capturing units or image capturing unit positions are parallel. In this case, equilateral triangles can for example be used and the focal length of the image capturing units so as to provide an expression for the distance between the image capturing unit plane and a point X, which is to be measured. The disparity estimation is based on finding corresponding points in the both images. It is in one example pre-assumed that a translation of the carrier 102 is performed in a solely horizontal direction. There are many methods known in the art for finding disparity estimations so as to provide stereo processing. The known methods includes correlation based methods, property based methods and methods based on a local structure.

In one example, the stereo processing is implemented by means of multimedia instructions for example in a personal computer.

The stereo processed images are then ortho-projeted (or ortho-rectified) in an ortho projecting step 518. In the illustrated example, the whole map representation is geometrically corrected such that the scale of the image is uniform, once the whole map representation has been formed. In an alternative example (not shown), the ortho projection is performed on each stereo processed image as the stereo processed images are formed. The ortho-projected map representation is adjusted for topographic relief, lens distortion and/or camera tilt. This means that the map representation is equivalent to a map. The ortho-projected image can be used to measure true distances, angles and areas.

The ortho projected map representation is then textured in a texturing step 519 based on the ortho projected map representation formed in the preceding step. In an alternative example (not shown), the texturing is performed on each ortho-projected image as the ortho-projected images are formed.

The accordingly provided map representation is then used in an application step 520. There are several applications which can be based on the 3D mapping technique as described above. In the following, some examples of such applications will be described.

In a first functional mode, all pixels in the map representation are specified in three geographical dimensions. The three dimensional map representation represents elevation and lateral data for the geographical area covered by the map representation.

In a second functional mode, difference analysis is provided on two three-dimensional map representations so as to provide a "map" comprising difference values. Accordingly, the arrangement 101 mounted on a movable carrier 102 provides a three dimensional map representation of the area 103 at two different times. Thereafter, the difference analysis is provided on the two three-dimensional map representations so as to provide a height difference value for each analyzed pixel pair. Each pixel pair comprises pixels corresponding to the same geographical location in the two map representations.

Figure 7:
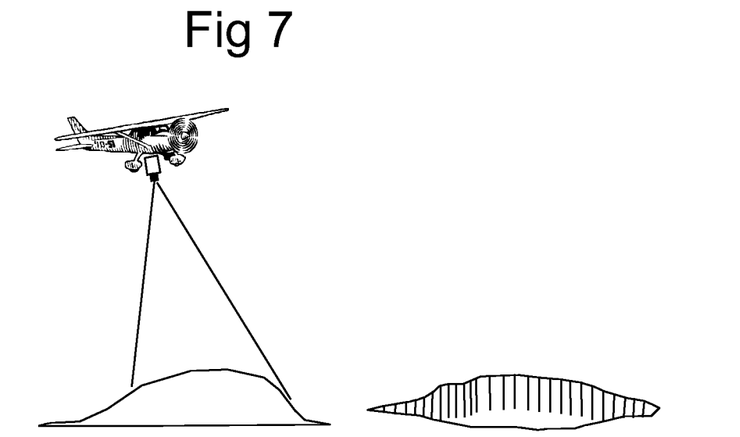
FIG. 7 illustrates schematically an application of the arrangement in FIG. 1 in a volume measuring application.

In FIG. 7, a volume measuring application is illustrated. The volume can be determined by measuring a topographical convex or concave formation in relation to a well defined ground plane geometry. The volume is then calculated by comparing the elevation value in each location with the corresponding ground value. Applications related to convex formations can be mountains of garbage, prospect measurements of excavation volumes etc. Applications related to concave formations are for example measurements of open cut volumes.

Volumes can also be measured by using a three dimensional differential analysis (the second functional mode). This application is for example applicable to erosion measurements and preventive earth slip measurements. In accordance with this application, three dimensional map representations are calculated at different times and corresponding points (pixels) are compared to each other.

Figure 8:
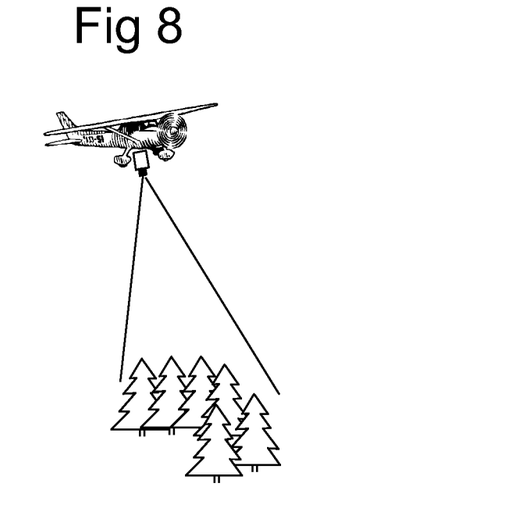
FIG. 8 illustrates schematically an application of the arrangement in FIG. 1 in a forest application.

In FIG. 8, an application for measuring of forest parameters is illustrated. These parameters comprise for example tree-height, number of trees and tree volume. In one example, individual trees can be created from the three dimensional data by using a segmentation algorithm to capture the crown closure. The tree height is in one example defined as the topmost pixel in the tree segment minus a terrain elevation value in the corresponding lateral position which can be extracted by an elevation database or by direct measure of the ground elevation. A volume of wood can be calculated based on the number of trees (derivable from the number of segmented trees). In order to refine the determination of the volume of wood, also the determined tree heights can be used in the calculation.

Figure 9:
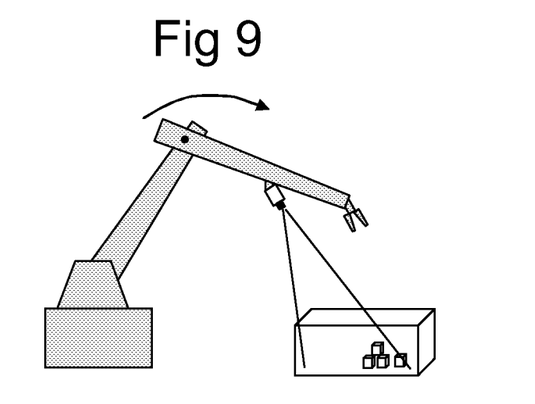
FIG. 9 illustrates schematically an application of the arrangement in FIG. 1 in an industrial robot application.

In FIG. 9, an industrial robotic application is illustrated. In said application three-dimensional information is continuously created related to an item or object which shall be operated or processed by an industrial robot. The arrangement for providing three-dimensional information (generated by stereo photogrametry as described in relation to FIGS. 1 to 6) is arranged directly on the robot lever arm. The three dimensional information possibly together with a texture (as described in relation to FIG. 5) can be used as feed back information in a trajectory calculation algorithm and/or an algorithm for gripping.

Figure 10:
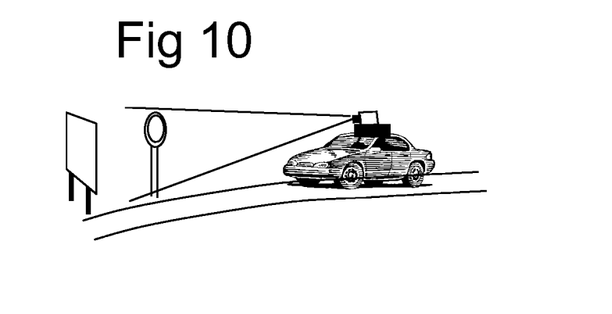
FIG. 10 illustrates schematically an application of the arrangement in FIG. 1 in a traffic application

In FIG. 10, man made objects such as road objects (e.g. road signs, road elements such as lamp posts, bridge pillars etc.) are detected by matching with predefined structure models and thereafter positioned in three dimensions of a geographical coordinate system using the three dimensional stereo modelling technique as described above.

Other applications which can be based on the 3D mapping technique as described above includes line of sight calculations, wherein visible areas and shaded areas are calculated with reference from a given geographical position. The line of sight calculations are provided by means of a scanning algorithm. The scanning algorithm includes for example finding the shaded areas by determining heights which shadow terrain parts lying behind and determining the sizes of the shadowed areas.

Another application, in which the 3D mapping technique can be used, is reconnaissance of power transmission line networks. In this application, trees and underbrush in the vicinity of the power transmission lines are measured from the 3D map representations. The measurement involves determining the height and location of the trees/underbrush in relation to the power transmission line. Thereafter, risk trees can be determined based on the determined heights and locations. Further, growth of the underbrush can be determined using differential analysis.

The maps provided with the above mentioned technique can also be used in computer games, serious gaming and training. In these applications digital models of real landscapes, urban environments or other real-life objects are used so as to enhance the sense of reality. Especially, the maps can be used in a "man in the loop scenario", wherein a player acts physically so as to drive the 3D scenario presented on a screen forwards. In one example, the man in the loop-scenario comprises a training-bicycle driving the scenario; the load on the bicycle can further be related to the scenario so that it becomes heavy to pedal up-hills and lighter down-hills.

The maps can also be used in surveillance and reconnaissance applications. In both these applications, it is desirable to, for example identify and geographically localize different objects, perform mapping operations, terrain classification and perform moving target identification. Usage of differential analysis reveals masked objects, moving targets and other changes in a geographical region.

The maps can be used in a variety of other applications, for example in GPS navigators.

Figure 11:
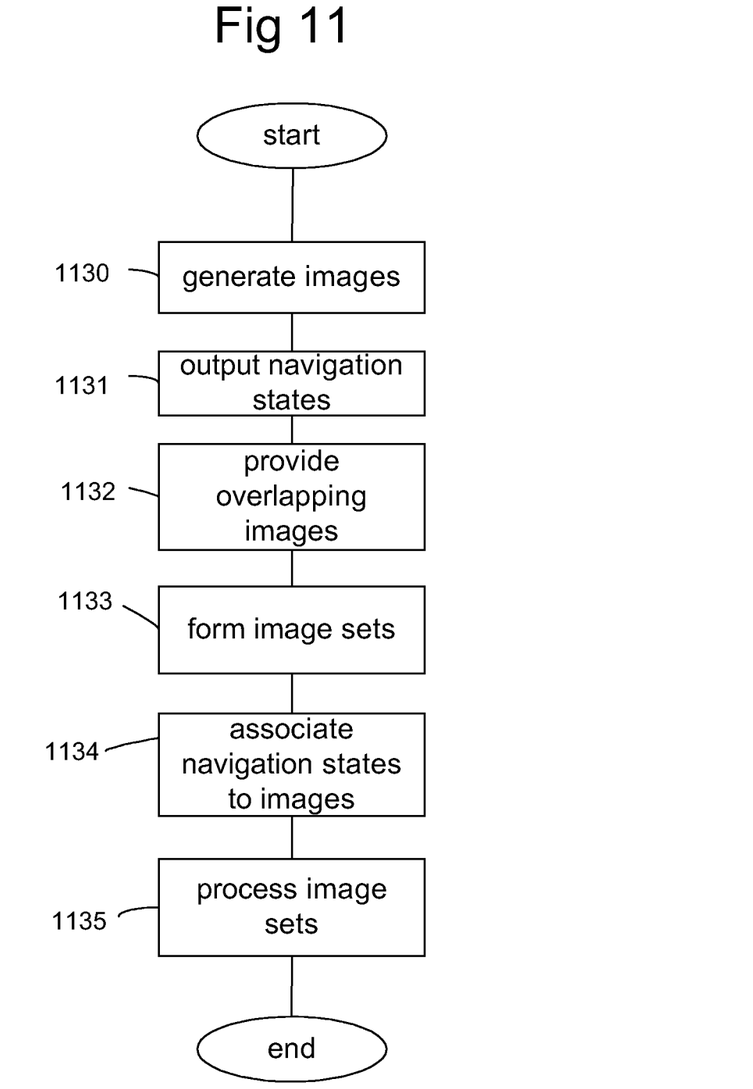
FIG. 11 is a flow chart showing an example of a method for providing a three dimensional map representation of an area.

In FIG. 11 a method for providing a three dimensional map representation of an area comprises the steps of: generating 1130 time recorded images, outputting time recorded navigation states 1131 comprising position and attitude, providing 1132 a plurality of at least partly overlapping images each covering at least a part of said area, forming 1133 an arbitrary number of at least partly overlapping image sets from said provided at least partly overlapping images, and to, for each time recorded image to be processed by a stereo processor, associate 1134 the navigation states relating to a corresponding time record and processing 1135 said image sets so as to provide said three dimensional map representation. The steps are not necessarily performed in the above given order.

The invention claimed is:

1. An arrangement comprising an image generating unit, a navigation unit and processing unit for generating a three dimensional map representation of an area, the arrangement comprising: an image generating unit arranged to generate time recorded images, said image generating unit being arranged to provide a plurality of at least partly overlapping images each covering at least a part of said area, a navigation unit arranged to output time recorded navigation states of the image generating unit as the images are generated, wherein the time recorded navigation states comprises a three-dimensional position vector and a three-dimensional attitude vector and optionally a three-dimensional velocity vector, and a processing unit arranged to, based on said navigation states, stereo process an arbitrary number of the plurality of at least partly overlapping image sets generated by said image generating unit so as to provide said three dimensional map representation, wherein the processing unit is arranged to, for each time recorded image to be stereo processed, associate each pixel to a corresponding one of the navigation states relating to a corresponding time record and to perform the stereo processing based on the associated navigation states so that all pixels in the map representation are specified in three geographical dimensions associated with a geographical coordinate on the ground, wherein the processing unit is arranged to form a plurality of three dimensional map representation parts each corresponding to a unique image set and to generate the three dimensional map representation of the area based upon the three dimensional map representation parts.

2. The arrangement according to claim 1, wherein the image generating unit is mountable on a movable carrier.

3. The arrangement according to claim 1, wherein the navigation unit comprises an inertial navigation system.

4. The arrangement according to claim 1, wherein the navigation unit comprises provides position data in a predetermined coordinate system and relates each pixel to a point in the predetermined coordinate system.

5. The arrangement according to claim 1, wherein the processing unit is arranged to determine a relation between the images in each image set based on the navigation states associated to the respective images so as to provide matching between the images.

6. The arrangement according to claim 1, wherein the processing unit is arranged to transform each map representation part based on height data so as to perform ortho projection.

7. The arrangement according to claim 1, wherein the arrangement is arranged to form the three dimensional map representation in real time.

8. A platform comprising an image generating unit, a navigation unit and processing unit for generating a three dimensional map representation of an area, comprising: an arrangement for providing a three dimensional map representation of an area, the arrangement comprising: an image generating unit arranged to generate time recorded images, said image generating unit being arranged to provide a plurality of at least partly overlapping images each covering at least a part of said area, a navigation unit arranged to output time recorded navigation states of the image generating unit as the images are generated, wherein the time recorded navigation states comprises a three-dimensional position vector and a three-dimensional attitude vector and optionally a three-dimensional velocity vector, and a processing unit arranged to, based on said navigation states, stereo process an arbitrary number of the plurality of at least partly overlapping image sets generated by said image generating unit so as to provide said three dimensional map representation, wherein the processing unit is arranged to, for each time recorded image to be stereo processed, associate each pixel to a corresponding one of the navigation states relating to a corresponding time record and to perform the stereo processing based on the associated navigation states so that all pixels in the map representation are specified in three geographical dimensions associated with a geographical coordinate on the ground, wherein the processing unit is arranged to form a plurality of three dimensional map representation parts each corresponding to a unique image set and to generate the three dimensional map representation of the area based upon the three dimensional map representation parts.

9. The platform according to claim 8, wherein the platform is chosen from a group comprising a land vehicle, satellite, and aircraft watercraft, or wherein the arrangement is configured to be arranged on a person.

10. A method for generating a three dimensional map representation of an area with an image generating unit, a navigation unit and processing unit, the method comprising: generating time recorded images with an image generating unit, generating with said image generating unit a plurality of at least partly overlapping images each covering at least a part of said area, generating with said image generating unit an arbitrary number of at least partly overlapping image sets from said provided at least partly overlapping images, outputting with a navigation unit time recorded navigation states comprising a three-dimensional position vector and a three-dimensional attitude vector and optionally a three-dimensional velocity vector of the image generating unit as the images are generated, and stereo processing with a processing unit said image sets based on the navigational states so as to provide said three dimensional map representation, wherein for each time recorded image to be stereo processed the navigation states relating to a corresponding time record are associated with the image, said associating comprising correlating each pixel of each time recorded image to a corresponding navigation state, and wherein the stereo processing is performed based on the associated navigation states so that all pixels in the map representation are specified in three geographical dimensions associated with a geographical coordinate on the ground, wherein the stereo processing comprises forming a plurality of three dimensional map representation parts each corresponding to a unique image set and generating the three dimensional map representation of the area based upon the three dimensional map representation parts.

11. A computer program product configured to generate a three dimensional map representation of an area with an image generating unit, a navigation unit and processing unit, comprising: a non-transitory computer readable medium; and a programme code recorded on the computer readable medium for performing a method for generating a three dimensional map representation of an area when said computer programme is run on a computer, the method comprising generating time recorded images with an image generating unit, generating with said image generating unit a plurality of at least partly overlapping images each covering at least a part of said area, generating with said image generating unit an arbitrary number of at least partly overlapping image sets from said provided at least partly overlapping images, outputting with a navigation unit time recorded navigation states comprising a three-dimensional position vector and a three-dimensional attitude vector and optionally a three-dimensional velocity vector of the image generating unit as the images are generated, and stereo processing with a processing unit said image sets based on the navigational states so as to provide said three dimensional map representation, wherein for each time recorded image to be stereo processed the navigation states relating to a corresponding time record are associated with the image, said associating comprising correlating each pixel of each time recorded image to a corresponding navigation state, and wherein the stereo processing is performed based on the associated navigation states so that all pixels in the map representation are specified in three geographical dimensions associated with a geographical coordinate on the ground, wherein the stereo processing comprises forming a plurality of three dimensional map representation parts each corresponding to a unique image set and generating the three dimensional map representation of the area based upon the three dimensional map representation parts.

12. A non-transitory computer readable medium having embodied thereon a computer program for processing by a computer to generate a three dimensional map representation of an area with an image generating unit, a navigation unit and processing unit, the computer program comprising: a first code segment for generating time recorded images with an image generating unit; and a second code segment for providing a plurality of at least partly overlapping images with the image generating unit, a fourth code segment for outputting with a navigation unit time recorded navigation states of the image generating unit as the images are recorded, the outputting time recorded navigation states comprising a three-dimensional position vector and a three-dimensional attitude vector and optionally a three-dimensional velocity vector of the image generating unit as the images are generated, and a fifth code segment for associating for each generated time recorded image the navigation states relating to a corresponding time record by correlating each pixel of each time recorded image to a corresponding navigation state with a navigation unit, and a third code segment for stereo processing with a processing unit, based on said associated navigation states, an arbitrary number of overlapping image sets generated by said image generating unit so as to provide a three dimensional map representation wherein all pixels are specified in three geographical dimensions associated with a geographical coordinate on the ground, wherein the stereo processing comprises forming a plurality of three dimensional map representation parts each corresponding to a unique image set and generating the three dimensional map representation of the area based upon the three dimensional map representation parts.

13. The arrangement according to claim 2, wherein the movable carrier comprises a land vehicle, satellite, aircraft, watercraft, or a person.

14. The arrangement according to claim 4, wherein the means for providing position data in a predetermined coordinate system comprises a GPS receiver or a map.

15. The platform according to claim 9, wherein the platform comprises a lorry, airplane, ship, or submarine.

16. The method according to claim 10, further comprising:
    forming a difference map representation based on a relation between heights in two three-dimensional map representations of corresponding areas.

17. The method according to claim 16, further comprising:
    utilizing the difference map representation for performing volume determinations.

18. The arrangement according to claim 1, wherein the navigation unit calculates motions of the image generating unit, continuously calculates the position and attitude of the image generating unit, and is mounted in known relation to image generating unit.

19. The arrangement according to claim 1, wherein the navigation states comprise a three dimensional position vector and a three dimensional attitude vector in the predefined coordinate system.

20. The arrangement according to claim 1, wherein the navigation states comprise a three-dimensional velocity vector in a predefined coordinate system.

21. The method according to claim 10, further comprising:
    forming a difference map representation based on a relation between heights in two three-dimensional map representations of corresponding areas.

22. The method according to claim 19, further comprising: performing volume determinations utilizing the difference map representation.

23. The arrangement according to claim 4, wherein the navigation unit relates each pixel to a point in the predetermined coordinate system.

* * * * *